(12) United States Patent
Liu

(10) Patent No.: US 8,506,194 B2
(45) Date of Patent: Aug. 13, 2013

(54) LIQUID DISPENSING DEVICE WITH TWO DIFFERENT APPLICATION HEADS AT BOTH ENDS RESPECTIVELY

(75) Inventor: Li-Mei Liu, Guang Dong Province (CN)

(73) Assignee: Allen & Thomas Cosmetic Accessories Co., Ltd., Zhuhai (CN)

( * ) Notice: Subject to any disclaimer, the term of this patent is extended or adjusted under 35 U.S.C. 154(b) by 95 days.

(21) Appl. No.: 13/290,655

(22) Filed: Nov. 7, 2011

(65) Prior Publication Data

US 2013/0114991 A1   May 9, 2013

(51) Int. Cl.
  *B05C 17/00*  (2006.01)
  *B05C 17/01*  (2006.01)
  *B05C 17/02*  (2006.01)

(52) U.S. Cl.
  USPC ............... 401/175; 401/17; 401/21; 401/150; 401/171; 401/172; 401/34

(58) Field of Classification Search
  USPC ............................. 401/17, 150, 171, 172, 175
  See application file for complete search history.

(56) References Cited

U.S. PATENT DOCUMENTS

| 6,227,739 | B1 * | 5/2001 | Kageyama | 401/172 |
| 8,308,384 | B2 * | 11/2012 | Zhang | 401/174 |
| 2006/0165474 | A1 * | 7/2006 | Zhang et al. | 401/172 |
| 2007/0025804 | A1 * | 2/2007 | Zhang et al. | 401/174 |
| 2009/0297252 | A1 * | 12/2009 | Prague | 401/265 |
| 2012/0014739 | A1 * | 1/2012 | Zhang | 401/175 |

\* cited by examiner

*Primary Examiner* — David J. Walczak
*Assistant Examiner* — Joshua Wiljanen

(57) ABSTRACT

A liquid dispensing device is provided with a container having first and second spaces for storing two different lotions respectively; a first transmission assembly in the first space; a first dispensing assembly in ratchet engagement with opening of the first space; a second transmission assembly in the second space; and a second dispensing assembly in ratchet engagement with opening of the second space. An individual is allowed to use either an application head in the first dispensing assembly or an application head in the second dispensing assembly.

10 Claims, 10 Drawing Sheets

LIQUID DISPENSING DEVICE WITH TWO DIFFERENT APPLICATION HEADS AT BOTH ENDS RESPECTIVELY

BACKGROUND OF THE INVENTION

1. Field of the Invention

The invention relates to liquid dispensers and more particularly to a liquid (e.g., lotion) dispensing device having two different application heads at both ends respectively to allow an individual to use either application head as desired, the liquid dispensing device having advantages including compactness, cost reduction, and liquid saving.

2. Description of Related Art

A conventional liquid (e.g., lotion) dispenser having two opposite application heads, as a prior work of the present inventor, is shown in FIGS. 9 and 10 and comprises an intermediate sleeve 80 lockingly fastened on a hollow, cylindrical first container 82 and a hollow, cylindrical second container 83 spaced from the first container 82. For using the second container 83, a person may push the sleeve 80 toward the first container 82 to disengage teeth 801 on an inner surface of the sleeve 80 from teeth 831 on an outer surface of the second container 83 until the teeth 801 are lockingly engaged with teeth 821 on an outer surface of the first container 82. Next, turning the second container 83 may turn a toothed positioning ring 923 which in turn turns a threaded bar 921 engaging through the positioning ring 923. Thus, the threaded bar 921 moves to push a externally threaded plunger 922 which in turn pushes out lotion contained in the second container 83 out of a second application head (not numbered) in the second container 83 to, for example, the face of the person for dispensing.

While the conventional liquid dispensers continue to enjoy market success, a number of drawbacks have been found by the present inventor. For example, both the first and second containers can be turned clockwise or counterclockwise. But only a clockwise turning of the container can dispense lotion. This, however, may jam the components of the liquid dispenser or even cause damage to the liquid dispenser if a person turns the container counterclockwise due to carelessness or other reasons. Further, its assembly is a complicated process because, for example, the assembly of the first and second containers 82, 83, the sleeve 80, and the positioning ring 923. The whole liquid dispenser will be useless if only of the above four components is malfunctioned or damaged. This can greatly increase the manufacturing cost. Thus, the need for improvement still exists.

SUMMARY OF THE INVENTION

It is therefore one object of the invention to provide a liquid dispensing device comprising a container comprising a first space for containing a quantity of first liquid and having a projecting opening at one end, and a second space for containing a quantity of second lotion and having a projecting opening at one end wherein the first space and the second space do not communicate each other; a first transmission assembly disposed in the opening of the first space and comprising a stepped diameter first sleeve, a first rotation ring fastened in the first sleeve, a first externally threaded pipe, and a first internally threaded plunger wherein one bare end of the first externally threaded pipe is partially retained in the first rotation ring, the first internally threaded plunger is engagement secured to the first externally threaded pipe, both the first sleeve and the first rotation ring are capable of co-rotating to turn the first externally threaded pipe, the first internally threaded plunger is sealingly engaged with an inner surface of the first space, and the first internally threaded plunger is capable of axially moving in the first space in a first predetermined range; a first dispensing assembly comprising a hollow, cylindrical mounting member, an elongated hollow first carrier, a first application head disposed at one end of the first carrier, and a first cap fittable to both the first sleeve and the first carrier wherein the mounting member comprises an inlet opening at one end and is disposed in both the first sleeve and the first carrier, and the first carrier is capable of axially moving in the mounting member in the first predetermined range; a second transmission assembly disposed in the opening of the second space and comprising a stepped diameter second sleeve, a second rotation ring fastened in the second sleeve, a second externally threaded pipe, and a second internally threaded plunger wherein one bare end of the second externally threaded pipe is partially retained in the second rotation ring, the second internally threaded plunger is engagement secured to the second externally threaded pipe, both the second sleeve and the second rotation ring are capable of co-rotating to turn the second externally threaded pipe, the second internally threaded plunger is sealingly engaged with an inner surface of the second space, and the second internally threaded plunger is capable of axially moving in the second space in a second predetermined range; and a second dispensing assembly comprising a hollow, stepped diameter second carrier, a tubular member, a second application head, an exterior case, and a second cap fittable to the second sleeve wherein the second carrier is disposed in the second sleeve, the tubular member is fastened in both the second carrier and the second application head, the second application head is engaged with the second carrier, the exterior case is lockingly put on the second application head and clamped between the second carrier and the second sleeve so that the second application head, the second carrier, the exterior case, and the second sleeve are fastened together.

The above and other objects, features and advantages of the invention will become apparent from the following detailed description taken with the accompanying drawings.

DETAILED DESCRIPTION OF THE INVENTION

Figure 1:
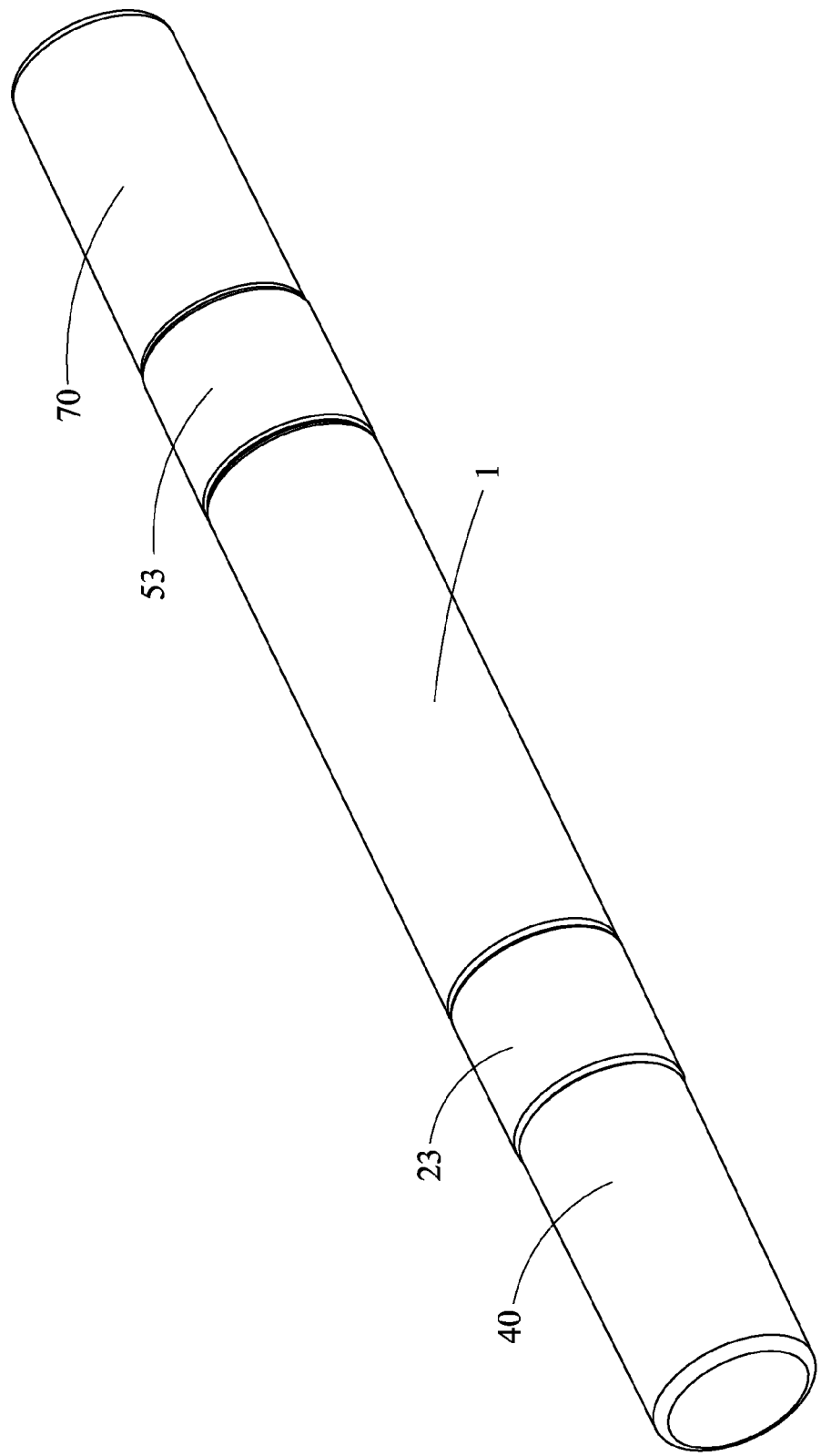
FIG. 1 is a perspective view of a liquid dispense according to the invention.

Referring to FIGS. 1 to 8, a liquid dispenser in accordance with the invention comprises the following components as discussed in detail below.

A cylindrical container 1 has both ends open and comprises a first space 11 for containing a quantity of lotion and having an opening at one end, a pawl member 111 formed on the projecting opening of the first space 11, a second space 12 for containing a quantity of lotion (which is preferably different from that contained in the first space 11) and having an opening at one end, and a pawl member 121 formed on the projecting opening of the second space 12. The first space 11 and the second space 12 do not communicate each other.

A first transmission assembly 2 is disposed in the opening of the first space 11 and comprises a stepped diameter first sleeve 23, a first rotation ring 21 in the first sleeve 23, a first externally threaded pipe 25, and a first internally threaded plunger 27. The first sleeve 23 comprises internal teeth 231 on an intermediate portion of an inner surface. The first rotation ring 21 comprises an externally toothed section 211 one end adapted to engagement secure to the internal teeth 231 to anchor the first rotation ring 21 within the first sleeve 23. One bare end of the first externally threaded pipe 25 is partially retained in the first rotation ring 21. The first internally threaded plunger 27 comprises a separate internally threaded sealing ring 271. Both the first internally threaded plunger 27 and the sealing ring 271 are put on the first externally threaded pipe 25 and engagement secured thereto so as to bring about a sealing effect as detailed later. Both the first sleeve 23 and the first rotation ring 21 may co-rotate to turn the first externally threaded pipe 25. The first internally threaded plunger 27 is sealingly engaged with the inner surface of the first space 11. Further, both the first internally threaded plunger 27 and the sealing ring 271 may move axially toward bottom of the first space 11 by engagement moving along the first externally threaded pipe 25. The first rotation ring 21 further comprises a ratchet wheel 212 on the other end. The pawl member 111 is engaged with the ratchet wheel 212 together they form a ratchet so that the first rotation ring 21 is allowed to turn in only one direction about the container 1.

A first dispensing assembly 3 comprises a hollow, cylindrical mounting member 31, an elongated hollow first carrier 32, and a first application head 33 integrally formed with one end of the first carrier 32. The mounting member 31 is partially disposed in the first sleeve 23 and comprises an inlet opening 310 at one end and an outwardly extending rim 312 on the other end. The first carrier 32 comprises a shroud 322 extending outward and toward the mounting member 31 for receipt a portion of the mounting member 31 not disposed in the first sleeve 23, and an inward extending annular stop member 321 at the open end of the shroud 322. The first carrier 32 may axially move in the mounting member 31 in a range from the rim 312 contacting the blind end of the shroud 322 to the position when the rim 312 contacts the stop member 321 and being stopped by the stop member 321 (i.e., preventing the first carrier 32 from disengaging from the mounting member 31). The first application head 33 comprises an inwardly extending rim 323 at its opening distal the first carrier 32. A ball 331 is partially disposed in the opening of the first application head 33 (i.e., projecting partially out of the opening of the first application head 33) and retained by the rim 323 but allowed to freely rotate to pick wet lotion (see FIGS. 2 to 4). Alternatively, the ball 333 may be replaced with a roller 333 (see FIG. 5) or a brush 332 (see FIG. 6) in other preferred configurations of the invention.

Figure 3:
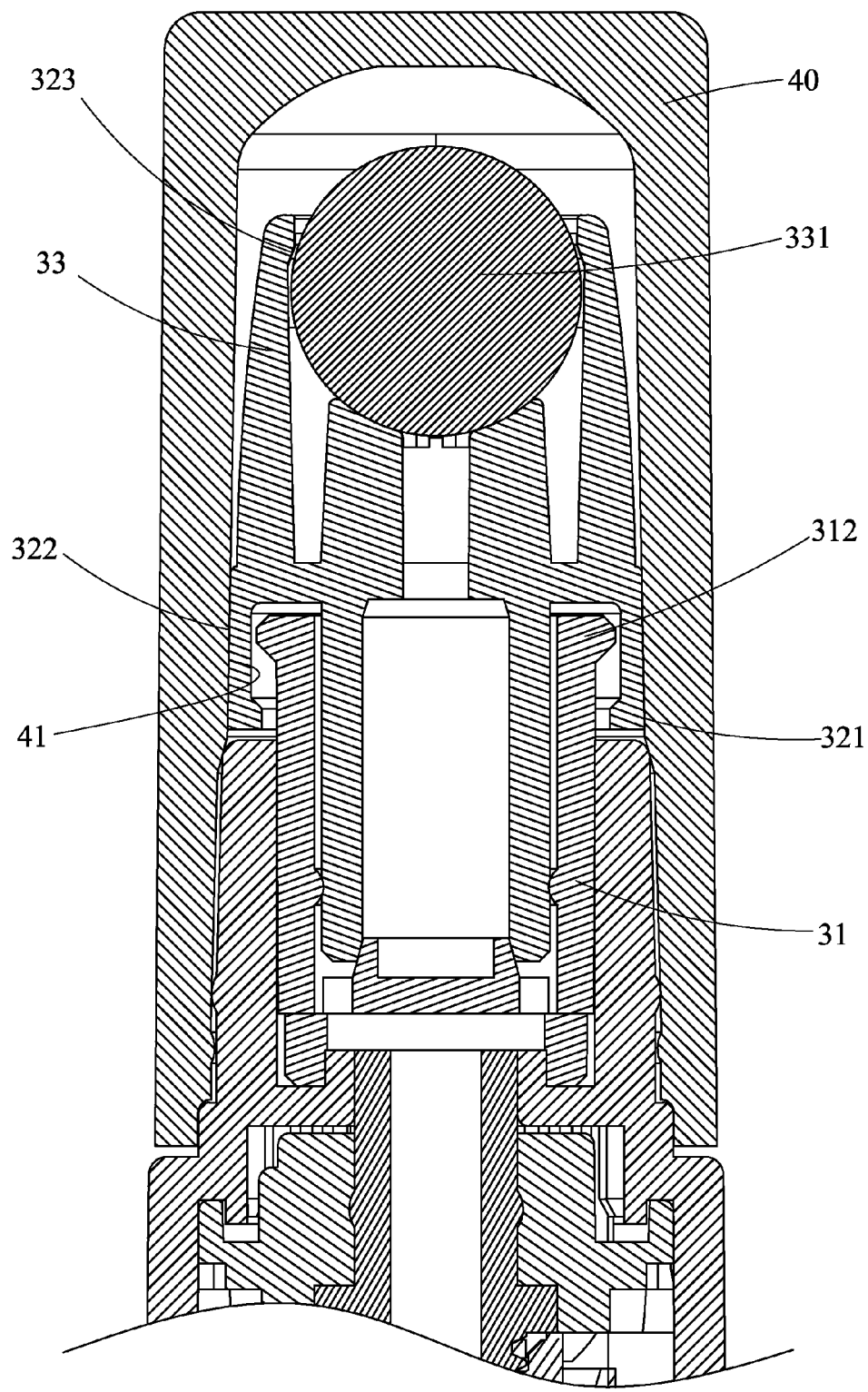
FIG. 3 is a longitudinal sectional view of the first cap of FIG. 1 showing the ball as a first preferred configuration of the invention and other components of the first dispensing assembly.
Figure 4:
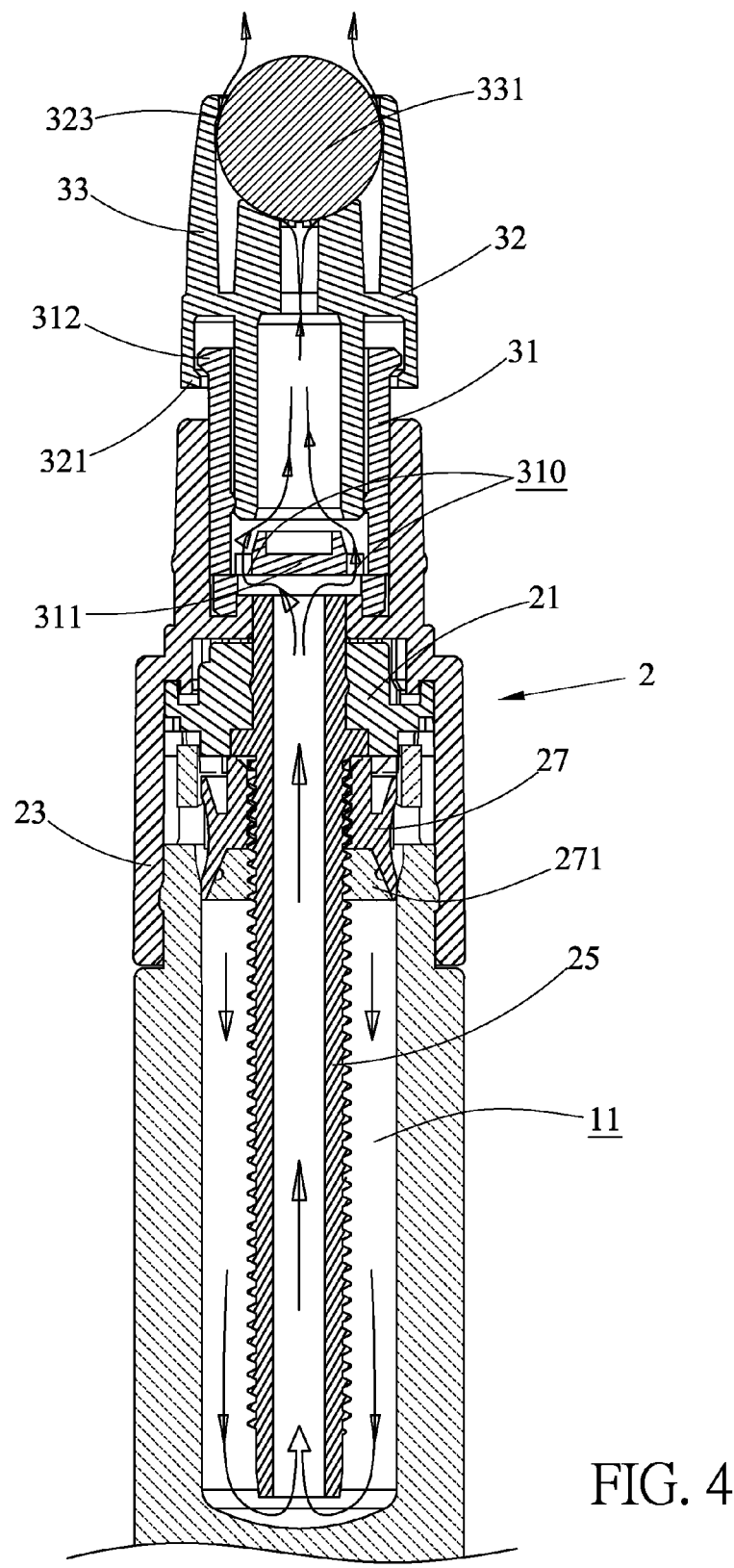
FIG. 4 is a longitudinal sectional view of FIG. 1 where the first cap is dislodged and lotion is picked up by the ball to be transferred to a desired body portion.

The mounting member 31 further comprises an internal block member 311 proximate the bottom end. The first carrier 32 may axially move to have its bottom end not being sealed by the block member 311 in an open state of the liquid dispenser as shown in FIG. 4 (i.e., the inlet opening 310 being not blocked). Alternatively, the bottom end of the first carrier 32 is blocked by the block member 311 when the liquid dispenser is closed as shown in FIG. 3 (i.e., the inlet opening 310 being blocked). As a result, lotion contained in the container 1 is prevented from leaking.

A cup-shaped first cap 40 comprises on its inner surface a locking section 41 distal its open end. In a closed state of the liquid dispenser, a forward portion of the first sleeve 23 is lockingly, sealingly concealed by a portion of the first cap 40 from its open end to the locking section 41 and the shroud 322 is lockingly, sealingly concealed by the locking section 41 (see FIG. 3). As such, the first carrier 32 is retained. To the contrary, a removal of the first cap 40 can pull the first carrier 32 away from the first sleeve 23 a short distance until the rim 312 contacts the stop member 321 and being stopped by the stop member 321 (see FIG. 4). As a result, the inlet opening 310 is open.

A second transmission assembly 5 is disposed in the opening of the second space 12 and comprises a stepped diameter second sleeve 53, a second rotation ring 51 in the second sleeve 53, a second externally threaded pipe 55, and a second internally threaded plunger 57. The second sleeve 53 comprises internal teeth 531 on an intermediate portion of an inner surface. The second rotation ring 51 comprises an externally toothed section 511 at one end adapted to engagement secure to the internal teeth 531 to anchor the second rotation ring 51 within the second sleeve 53. One bare end of the second externally threaded pipe 55 is partially retained in the second rotation ring 51. The second internally threaded plunger 57 comprises a separate internally threaded sealing ring 571. Both the second internally threaded plunger 57 and the internally threaded sealing ring 571 are put on the second externally threaded pipe 55 and engagement secured thereto so as to bring about a sealing effect as detailed later. Both the second sleeve 53 and the second rotation ring 51 may co-rotate to turn the second externally threaded pipe 55. The second internally threaded plunger 57 is sealingly engaged with the inner surface of the second space 12. Further, both the second internally threaded plunger 57 and the sealing ring 571 may move axially toward bottom of the second space 12 by engagement moving along the second externally threaded pipe 55. The second rotation ring 51 further comprises a ratchet wheel 512 on the other end. The pawl member 121 is engaged with the ratchet wheel 512 together they form a ratchet so that the second rotation ring 51 is allowed to turn in only one direction about the container 1.

A second dispensing assembly 6 comprises a hollow, stepped diameter second carrier 61, a tubular member 62, a bullet shaped second application head 63, and a hollow, conic exterior case 64. The second carrier 61 comprises an annular flange 611 at one end disposed in the second sleeve 53, and an axial passage 613 with the tubular member 62 partially fastened therein. The remaining portions of the tubular member 62 are axially inserted into the second application head 63 and fastened therein. One end of the second application head 63 is engaged with the second carrier 61. The exterior case 64 is put on the second application head 63 and clamped between the second carrier 61 and the second sleeve 53 by engaging with both the flange 611 and the second sleeve 53 so as to fasten the second application head 63, the second carrier 61, the exterior case 64, and the second sleeve 53 together.

A cup-shaped second cap 70 is put on the second sleeve 53 to close the liquid dispenser in an unused state.

Figure 2:
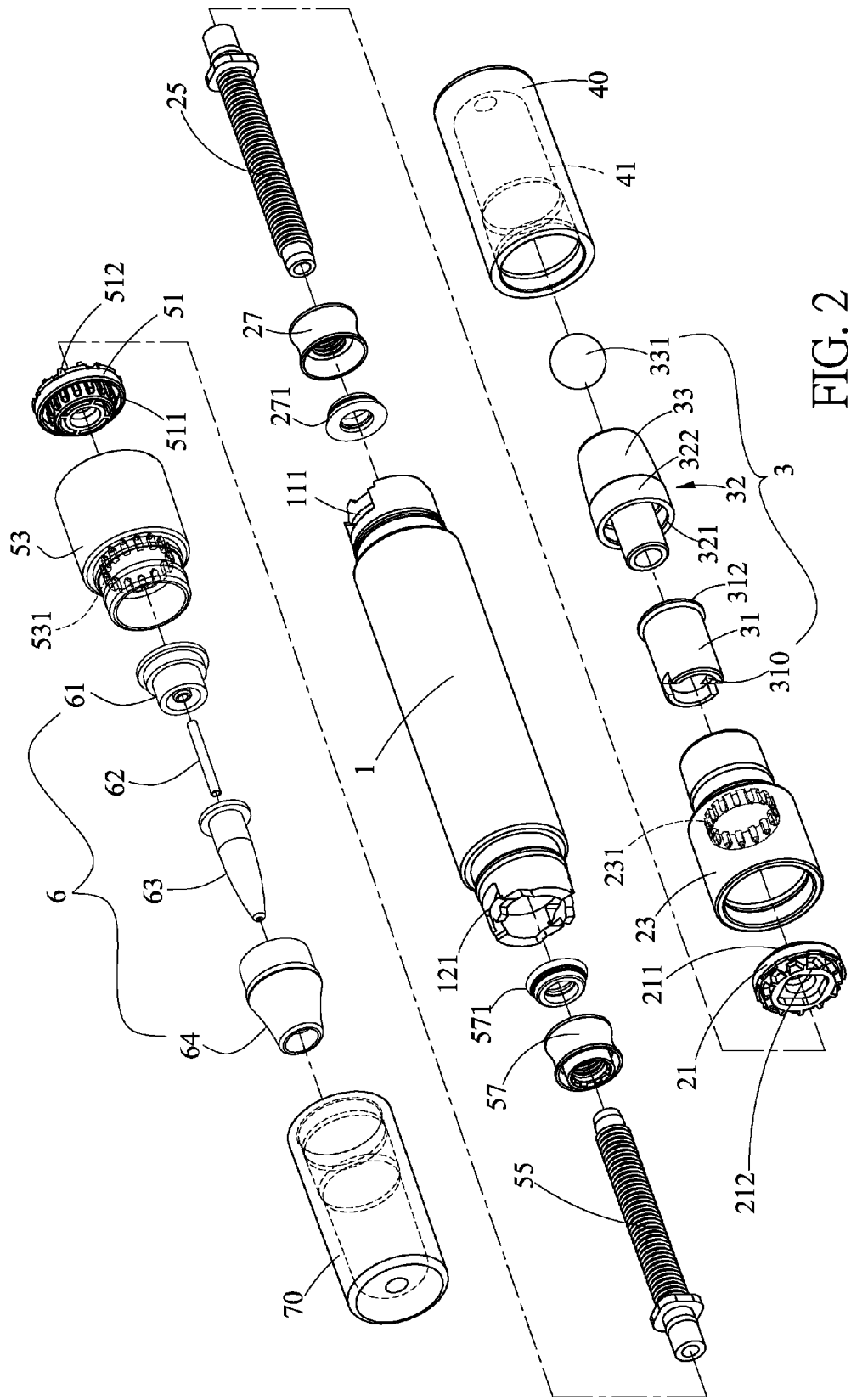
FIG. 2 is an exploded view of FIG. 1.

As shown in FIGS. 2 to 4, for opening the liquid dispenser a person may pull the first cap 40 away from the first sleeve 23. And in turn, the first carrier 32 bounces outward due to the removal of the force exerted by the locking section 41 on the first carrier 32. Thus, an axial passageway of the first carrier 32 disengages from the block member 311 to communicate with the inlet opening 310. The bouncing of the first carrier 32 will be stopped when the stop member 321 contacts the rim 312. Next, the person may turn the first sleeve 23 toward a predetermined direction (i.e., allowed direction such as clockwise direction). And in turn, the first rotation ring 21 co-rotates to turn the first externally threaded pipe 25. Next both the first internally threaded plunger 27 and the sealing ring 271 move axially toward bottom of the container 1 along the first externally threaded pipe 25. And in turn, lotion contained in the first space 11 is pushed to flow to the ball 331 via an axial channel of the first externally threaded pipe 25, the inlet opening 310, and the axial passageway of the first carrier 32 as indicated by arrows. The person may apply pushed out lotion to his or her body. It is envisaged by the invention that the first sleeve 23 is allowed to turn about the container 1 in only one direction (e.g., clockwise direction) due to the ratchet engagement of the ratchet wheel 212 and the pawl member 111. The amount of pushed out lotion for dispensing can be fairly controlled when turning the first sleeve 23.

Figure 5:
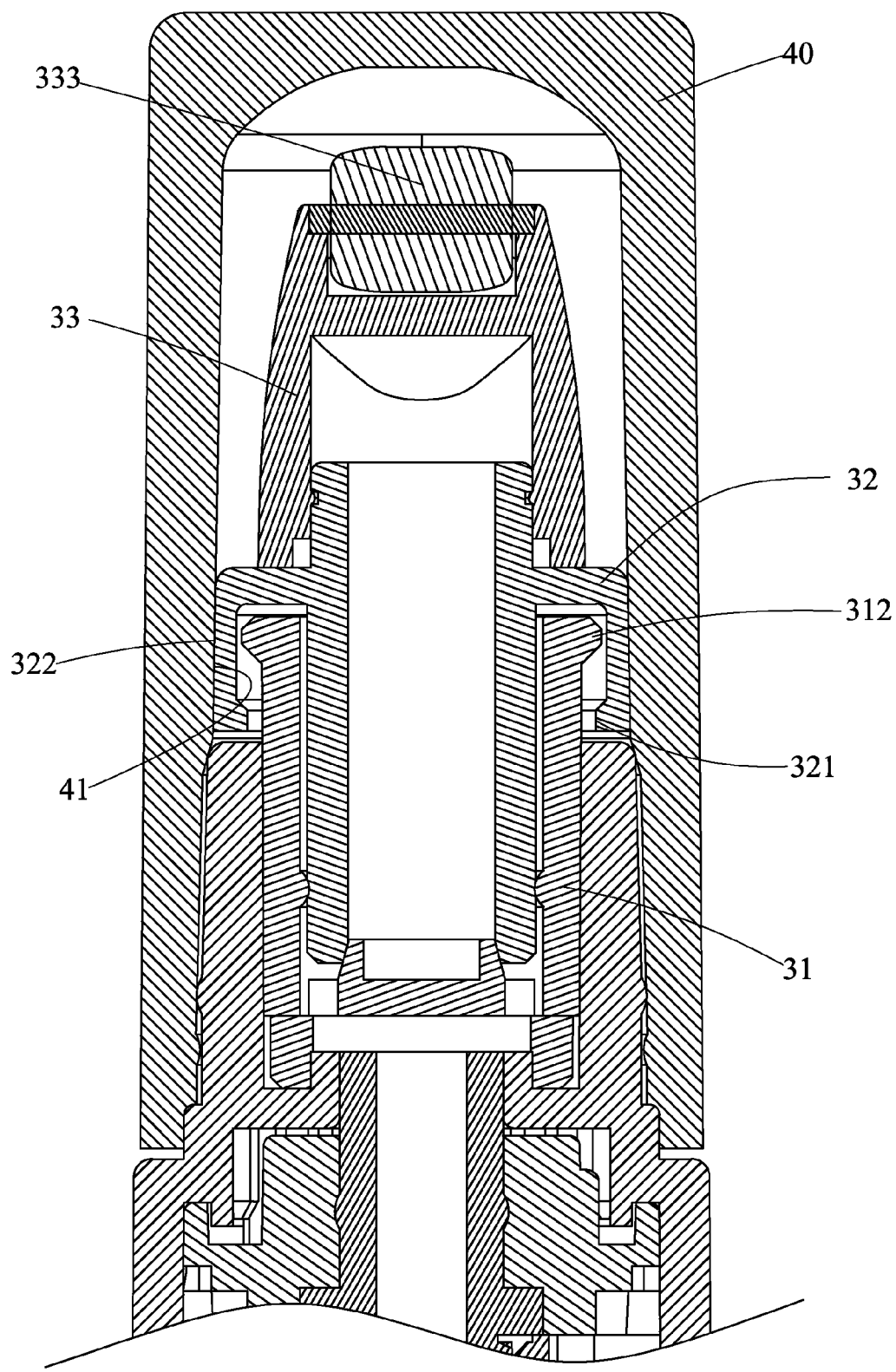
FIG. 5 is a view similar to FIG. 3 showing the ball replaced by a roller as a second preferred configuration of the invention.
Figure 6:
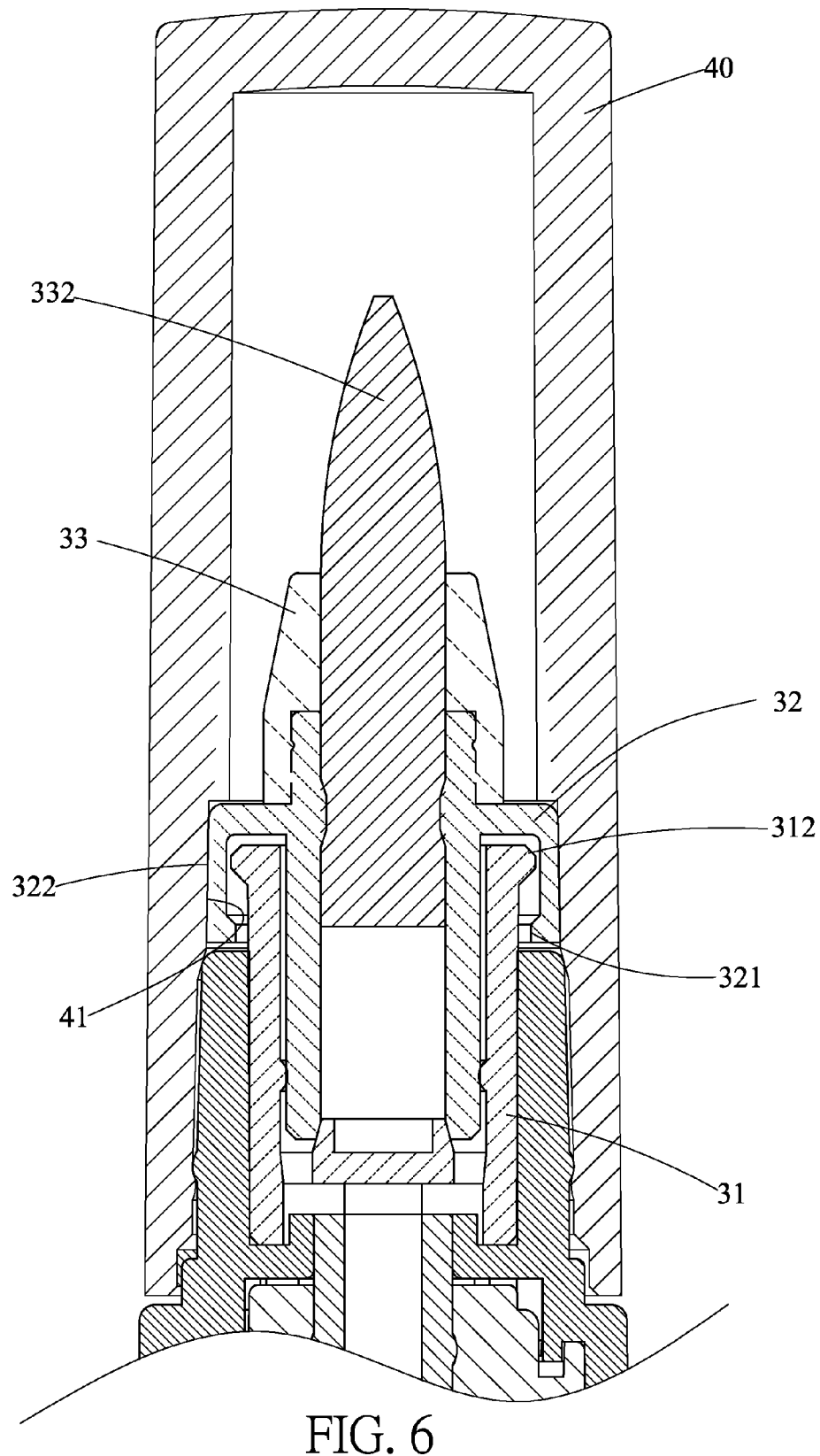
FIG. 6 is a view similar to FIG. 3 showing the ball replaced by a brush as a third preferred configuration of the invention.

As shown in FIGS. 3, 5, and 6, after use, the person may close the first cap 40 onto the first sleeve 23 as shown in FIG. 3. Thus, the first carrier 32 is pressed toward the first sleeve 23 due to the force exerted thereon by the locking section 41. As such, the axial passageway of the first carrier 32 engages the block member 311 to block the flow from the inlet opening 310 to the axial passageway of the first carrier 32. As a result, lotion in the first space 11 is prevented from leaking into the ball 331 (FIG. 3), the roller 333 (FIG. 5), or the brush 332 (see FIG. 6) via the inlet opening 310.

Figure 7:
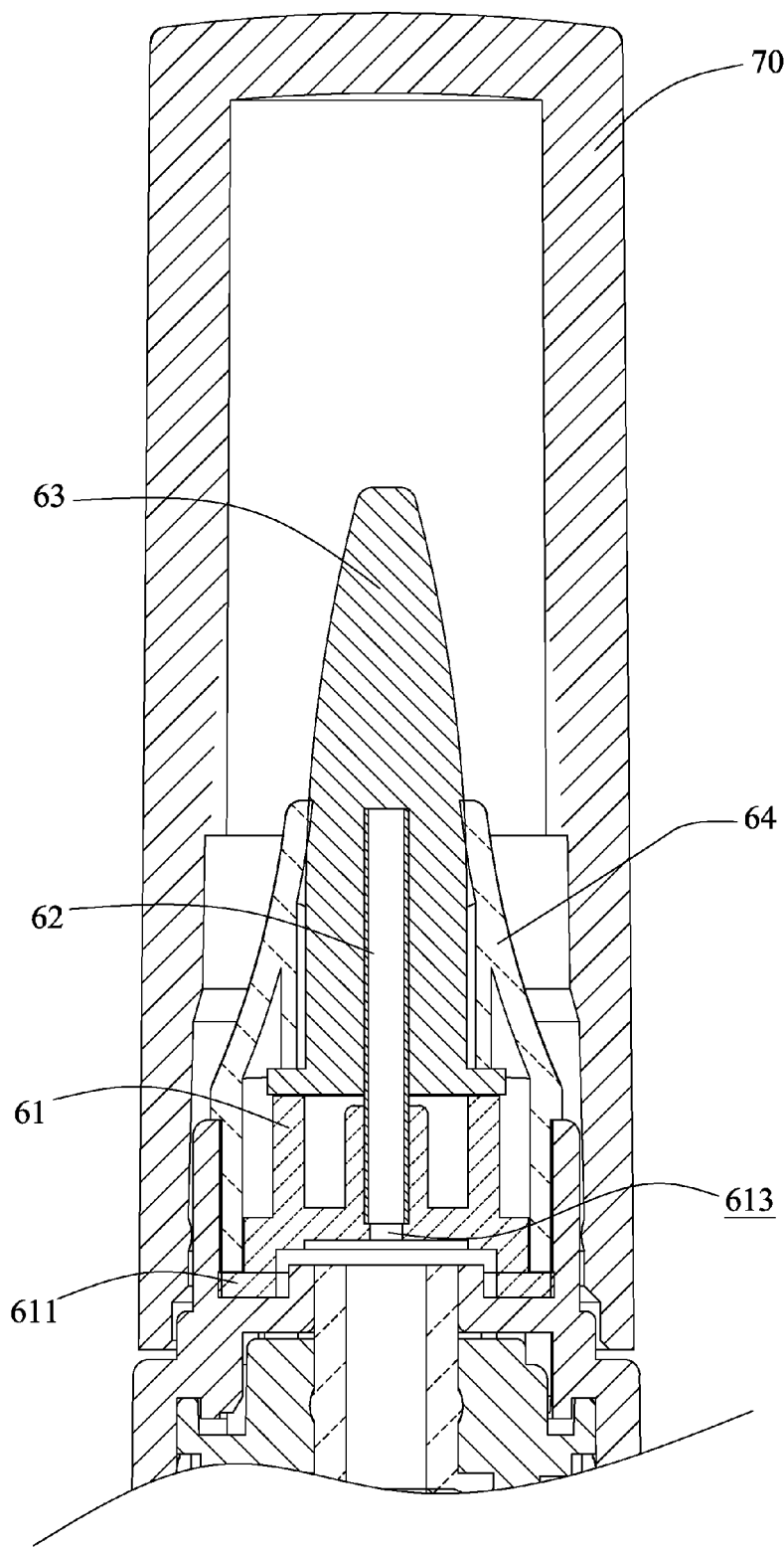
FIG. 7 is a longitudinal sectional view of the second cap of FIG. 1 showing the application head and other components of the second dispensing assembly.
Figure 8:
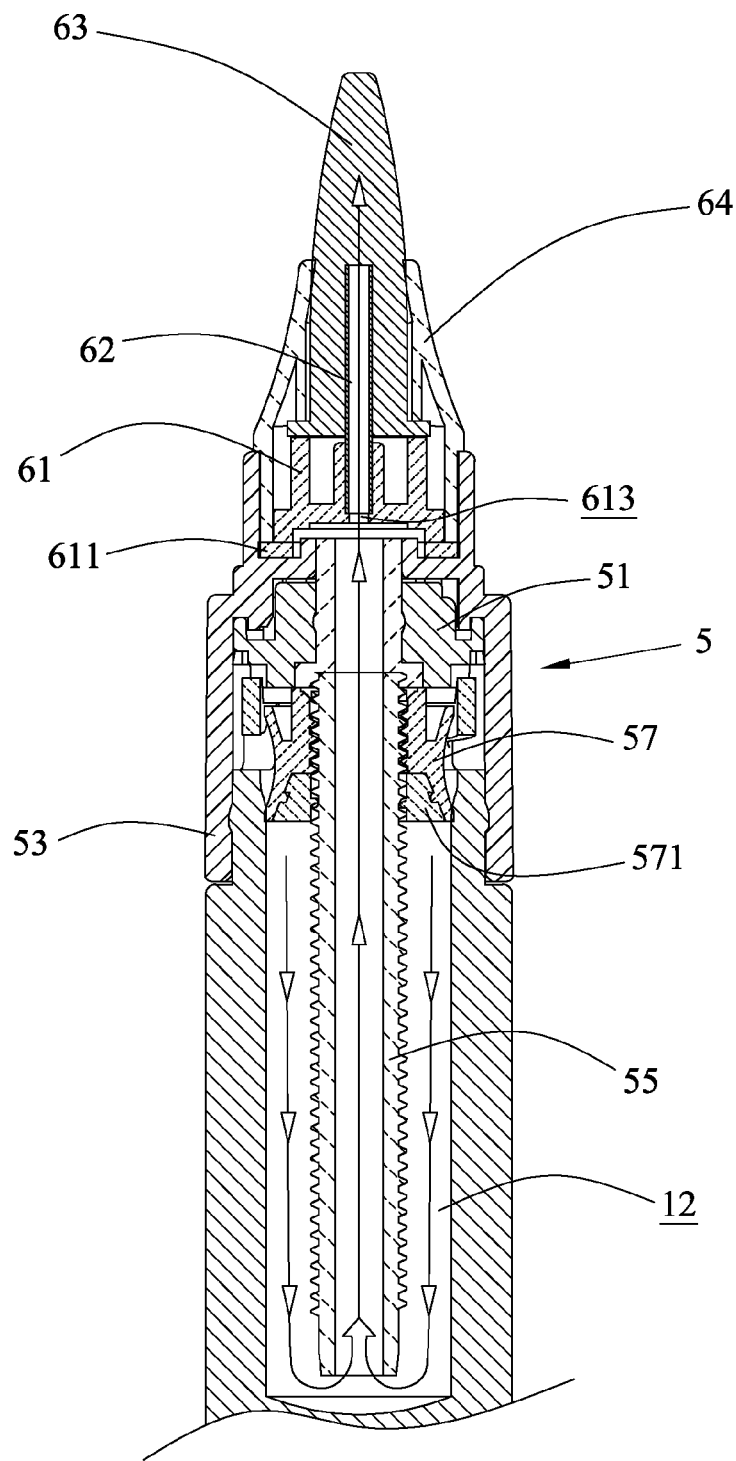
FIG. 8 is a longitudinal sectional view of FIG. 1 where the second cap is dislodged and lotion flows through the application head to be transferred to a desired body portion.
Figure 9:
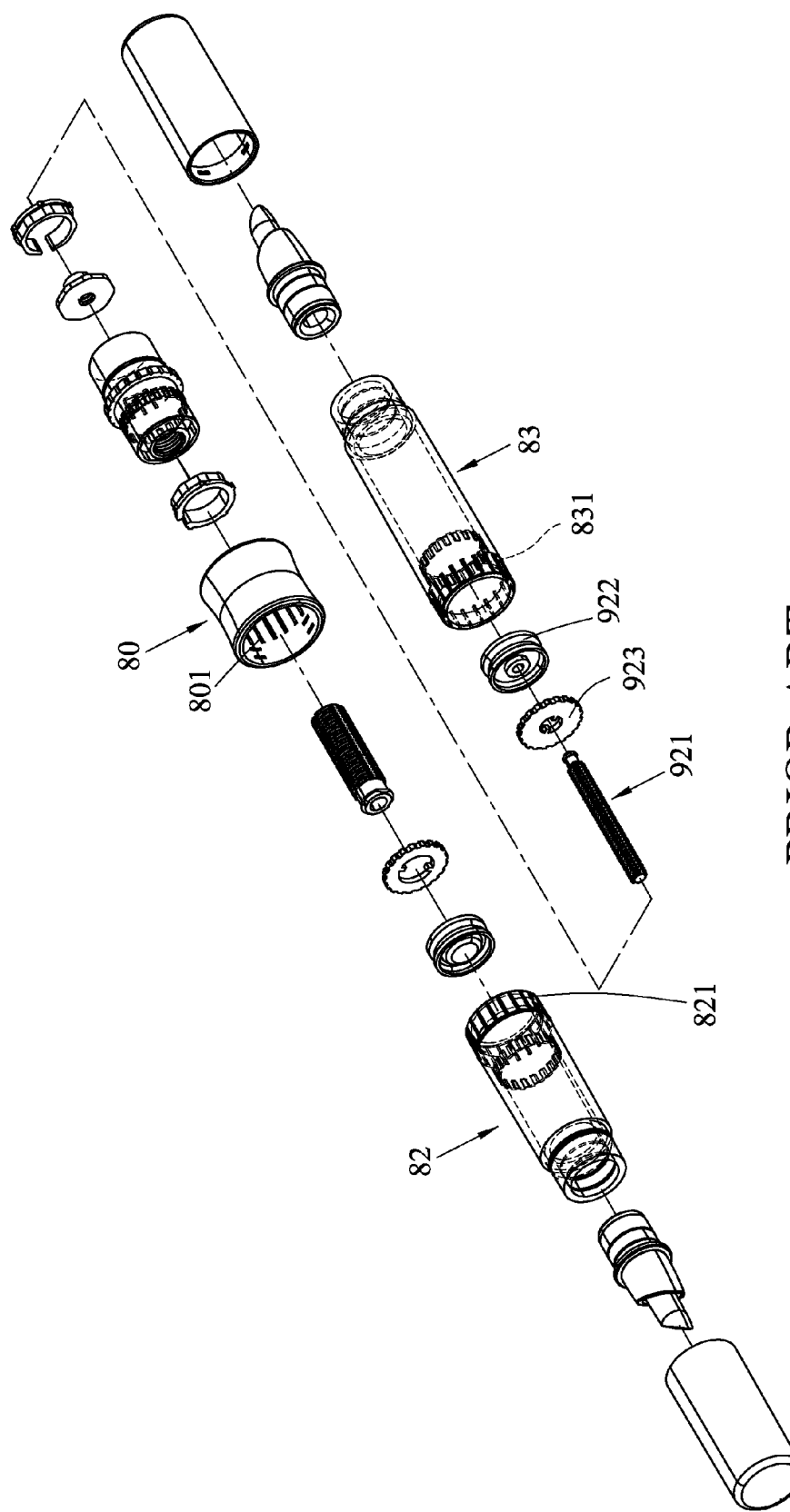
FIG. 9 is an exploded view of a conventional liquid dispenser.
Figure 10:
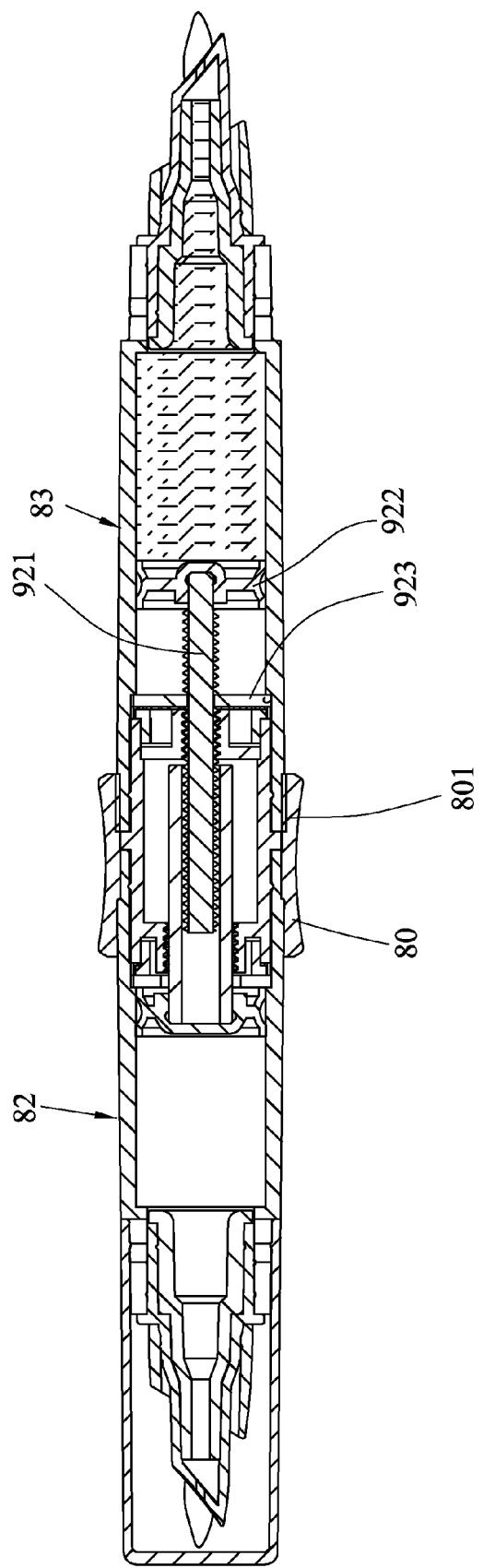
FIG. 10 is a longitudinal sectional view of the liquid dispenser shown in FIG. 9.

As shown in FIGS. 2, 7, and 8, for opening the liquid dispenser a person may alternatively pull the second cap 70 away from the second sleeve 53. Next, the person may turn the second sleeve 53 toward a predetermined direction (i.e., allowed direction such as clockwise direction). And in turn, the second rotation ring 51 co-rotates with the second externally threaded pipe 55. Next both the second internally threaded plunger 27 and the sealing ring 571 move toward bottom of the second space 12 along the second externally threaded pipe 55. And in turn, lotion contained in the second space 12 is pushed to flow to the second application head 63 via an axial channel of the second externally threaded pipe 55, the axial passage 613, and the tubular member 62 as indicated by arrows. The person may apply pushed out lotion to his or her body.

It is envisaged by the invention that after use the lotion remained in the tubular member 62 will not return to the second space 12 because the diameter of the tubular member 62 is sufficiently small and the strong cohesive force of the sticky lotion. Thus, the remained lotion in the tubular member 62 is prevented from leaking out of the second application head 63. Moreover, the second sleeve 53 is allowed to turn about the container 1 in only one direction (e.g., clockwise direction) due to the ratchet engagement of the ratchet wheel 512 and the pawl member 121. Further, the amount of lotion pushed out of the second space 12 for dispensing can be fairly controlled when turning the second sleeve 53. After use, the person may simply close the second sleeve 53 by putting the second cap 70 thereon.

While the invention has been described in terms of preferred embodiments, those skilled in the art will recognize that the invention can be practiced with modifications within the spirit and scope of the appended claims.

What is claimed is:

1. A liquid dispensing device comprising:
   a container comprising a first space for containing a quantity of first liquid and having a projecting opening at one end, and a second space for containing a quantity of second liquid and having a projecting opening at one end wherein the first space and the second space do not communicate with each other;
   a first transmission assembly disposed in the opening of the first space and comprising a stepped diameter first sleeve, a first rotation ring fastened in the first sleeve, a first externally threaded pipe, and a first internally threaded plunger wherein one bare end of the first externally threaded pipe is partially retained in the first rotation ring, the first internally threaded plunger is engagement secured to the first externally threaded pipe, both the first sleeve and the first rotation ring are capable of co-rotating to turn the first externally threaded pipe, the first internally threaded plunger is sealingly engaged with an inner surface of the first space, and the first internally threaded plunger is capable of axially moving in the first space in a first predetermined range;
   a first dispensing assembly comprising a hollow, cylindrical mounting member, an elongated hollow first carrier, a first application head disposed at one end of the first carrier, and a first cap fittable to both the first sleeve and the first carrier wherein the mounting member comprises an inlet opening at one end and is disposed in both the first sleeve and the first carrier, and the first carrier is capable of axially moving in the mounting member in the first predetermined range;
   a second transmission assembly disposed in the opening of the second space and comprising a stepped diameter second sleeve, a second rotation ring fastened in the second sleeve, a second externally threaded pipe, and a second internally threaded plunger wherein one bare end of the second externally threaded pipe is partially retained in the second rotation ring, the second internally threaded plunger is engagement secured to the second externally threaded pipe, both the second sleeve and the second rotation ring are capable of co-rotating to turn the second externally threaded pipe, the second internally threaded plunger is sealingly engaged with an inner surface of the second space, and the second internally threaded plunger is capable of axially moving in the second space in a second predetermined range;
   and a second dispensing assembly comprising a hollow, stepped diameter second carrier, a tubular member, a second application head, an exterior case, and a second cap fittable to the second sleeve wherein the second carrier is disposed in the second sleeve, the tubular member is fastened in both the second carrier and the second application head, the second application head is engaged with the second carrier, the exterior case is lockingly put on the second application head and clamped between the second carrier and the second sleeve so that the second application head, the second carrier, the exterior case, and the second sleeve are fastened together.

2. The liquid dispensing device of claim 1, wherein the first sleeve comprises internal teeth on an intermediate portion of an inner surface, wherein the first rotation ring comprises an externally toothed section engagement secured to the internal teeth of the first sleeve to retain the first rotation ring within the first sleeve, wherein the second sleeve comprises internal teeth on an intermediate portion of an inner surface, and wherein the second rotation ring comprises an externally toothed section engagement secured to the internal teeth of the second sleeve to retain the second rotation ring within the second sleeve.

3. The liquid dispensing device of claim 1, wherein the container further comprises a first pawl member on the opening of the first space, and a second pawl member on the opening of the second space; wherein the first rotation ring comprises a first ratchet wheel engaged with the first pawl member to form a first ratchet; and wherein the second rotation ring comprises a second ratchet wheel engaged with the second pawl member to form a second ratchet.

4. The liquid dispensing device of claim 1, wherein the mounting member comprises an internal block member proximate its bottom end, and wherein the first carrier is capable of axially moving to sealingly engage with the block member or not.

5. The liquid dispensing device of claim 1, wherein the mounting member further comprises an outwardly extending rim opposite to the inlet opening; wherein the first carrier comprises a shroud extending outward and toward the mounting member for receipt a portion of the mounting member not disposed in the first sleeve, and an inward extending annular stop member at one end of the shroud; and wherein the first carrier is capable of axially moving in the mounting member in the predetermined range from the rim contacting a blind end of the shroud to a position when the rim contacts the stop member so that the first carrier is prevented from disengaging from the mounting member.

6. The liquid dispensing device of claim 5, wherein the first cap comprises a locking section on an inner surface distal its open end; and wherein in a closed state of the first sleeve, a forward portion of the first sleeve is lockingly, sealingly concealed by a portion of the first cap from the open end of the first cap to the locking section thereof and the shroud is lockingly, sealingly concealed by the locking section; and wherein a removal of the first cap pulls the first carrier away from the first sleeve the first predetermined distance until the rim contacts the stop member.

7. The liquid dispensing device of claim 1, wherein the first application head comprises an inwardly extending rim at its opening distal the first carrier, and a ball partially projecting out of the first application head and retained by the rim of the first application head, the ball being capable of freely rotating.

8. The liquid dispensing device of claim 1, wherein the first application head comprises a brush.

9. The liquid dispensing device of claim 1, the first application head comprises a roller.

10. The liquid dispensing device of claim 1, wherein the first internally threaded plunger comprises a separate internally threaded sealing ring engagement secured to the first externally threaded pipe, and wherein the second internally threaded plunger comprises a separate internally threaded sealing ring engagement secured to the second externally threaded pipe.

* * * * *